United States Patent
Pfaff

(10) Patent No.: US 10,112,220 B2
(45) Date of Patent: Oct. 30, 2018

(54) HIGH-PRESSURE CLEANING APPLIANCE

(71) Applicant: Alfred Kärcher GmbH & Co. KG, Winnenden (DE)

(72) Inventor: Peter Pfaff, Aichwald (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 505 days.

(21) Appl. No.: 14/707,789

(22) Filed: May 8, 2015

(65) Prior Publication Data

US 2015/0239019 A1    Aug. 27, 2015

Related U.S. Application Data

(63) Continuation of application No. PCT/EP2012/072421, filed on Nov. 12, 2012.

(51) Int. Cl.
*B08B 3/02* (2006.01)
*B62B 1/12* (2006.01)

(52) U.S. Cl.
CPC ....... *B08B 3/026* (2013.01); *B08B 2203/0211* (2013.01); *B08B 2203/0223* (2013.01); *B62B 1/125* (2013.01)

(58) Field of Classification Search
CPC ..... B08B 2203/0211; B08B 2203/0223; B08B 3/026; B62B 1/125; B62B 2202/24; Y10T 16/451; A45C 13/262
See application file for complete search history.

(56) References Cited

U.S. PATENT DOCUMENTS

| 5,178,404 | A | * | 1/1993 | Chen ....................... B62B 1/125 16/113.1 |
| 5,429,306 | A | | 7/1995 | Schneider et al. |
| 5,431,428 | A | * | 7/1995 | Marchwiak .......... A45C 13/262 16/113.1 |
| 5,713,440 | A | | 2/1998 | Chen |

(Continued)

FOREIGN PATENT DOCUMENTS

| CN | 201309147 | 9/2009 |
| CN | 201472329 | 5/2010 |
| CN | 202006184 | 10/2011 |

(Continued)

*Primary Examiner* — Dominick L Plakkoottam
(74) *Attorney, Agent, or Firm* — Womble Bond Dickinson (US) LLP

(57) ABSTRACT

A high-pressure cleaning appliance is provided, including a housing having a motor and a pump, driven by the motor, arranged therein, and including at least two rotatably mounted running wheels, a push bar movable back and forth between a parking position and an operating position, and a locking device for releasably locking the push bar, the locking device including an actuating member which is coupled by at least one coupling member to at least one locking member which interacts with the push bar and is movable from a locking position to a release position by actuating the actuating member. So that the high-pressure cleaning appliance can be assembled more cost-effectively and more easily, the locking device includes a prefabricated constructional unit which forms the actuating member, the at least one coupling member and the at least one locking member and is movably mounted on or in the housing.

19 Claims, 7 Drawing Sheets

(56) References Cited

U.S. PATENT DOCUMENTS

| | | | |
|---|---|---|---|
| D547,014 S * | 7/2007 | Chen | D32/15 |
| 2008/0245425 A1* | 10/2008 | Alexander | B08B 3/026 137/565.13 |

FOREIGN PATENT DOCUMENTS

| | | |
|---|---|---|
| DE | 91 00 904.9 | 4/1991 |
| DE | 94 03 745.0 | 5/1994 |
| DE | 298 12 015 | 10/1998 |
| DE | 20 2005 019 979 | 4/2006 |

\* cited by examiner

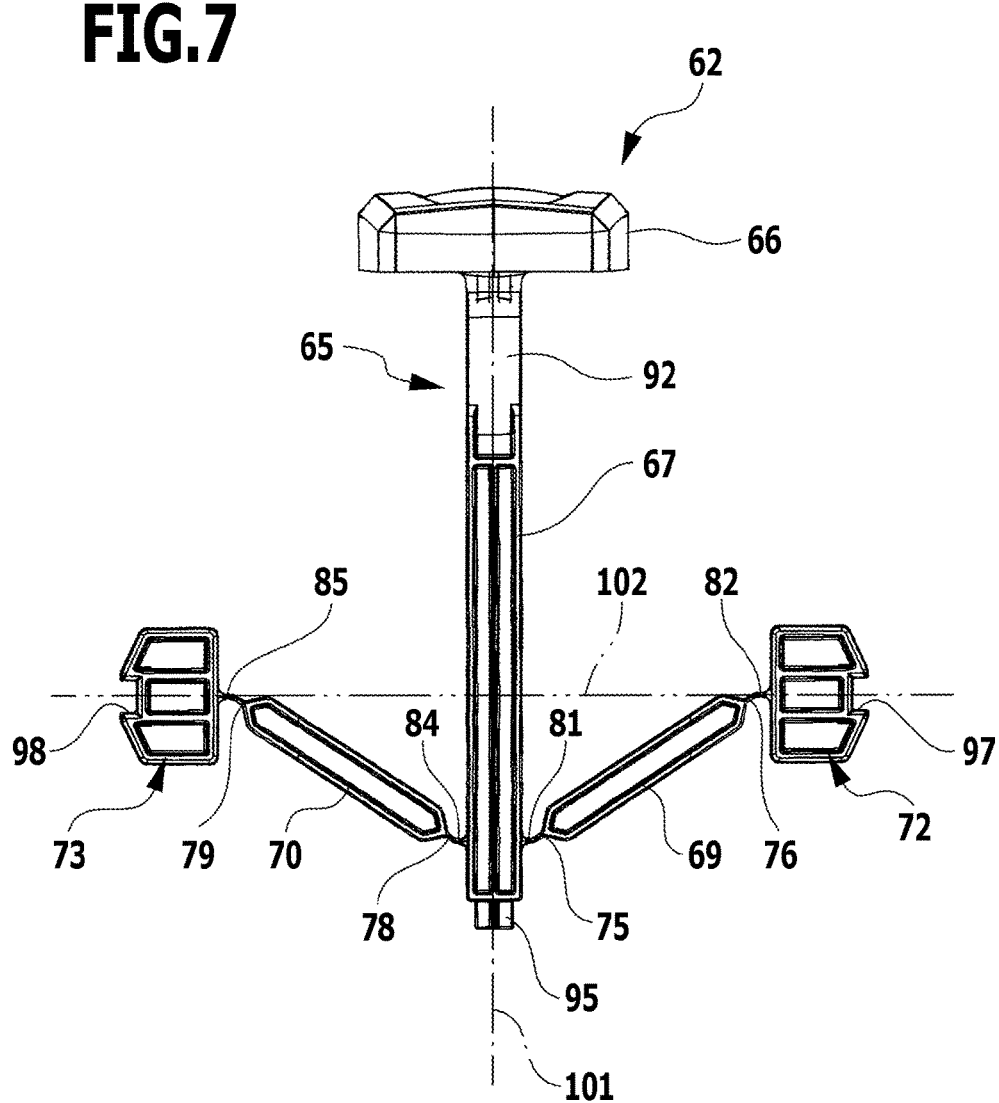

HIGH-PRESSURE CLEANING APPLIANCE

CROSS-REFERENCE TO RELATED APPLICATIONS

This application is a continuation of international application number PCT/EP2012/072421, filed on Nov. 12, 2012, which is incorporated herein by reference in its entirety and for all purposes.

BACKGROUND OF THE INVENTION

The invention relates to a high-pressure cleaning appliance comprising a housing having a motor and a pump for a cleaning liquid, driven by the motor, arranged therein, and comprising at least two rotatably mounted running wheels for moving the high-pressure cleaning appliance, a push bar movable back and forth between a parking position and an operating position, and a locking device for releasably locking the push bar in the parking position and/or in the operating position, the locking device comprising an actuating member which is coupled by at least one coupling member to at least one locking member which interacts with the push bar and is movable from a locking position to a release position by actuating the actuating member.

A cleaning liquid, preferably water, can be pressurized and directed at a surface to be cleaned by means of such high-pressure cleaning appliances. The cleaning liquid can be supplied to the pump of the high-pressure cleaning appliance via a liquid supply line. The cleaning liquid is pressurized by the pump, and the pressurized cleaning liquid can be discharged via a liquid discharge line, for example, a high-pressure hose. The high-pressure cleaning appliance has at least two rotatably mounted running wheels for moving the high-pressure cleaning appliance on a floor surface. To make it easier for the user to move the high-pressure cleaning appliance, the high-pressure cleaning appliance comprises a push bar, which can be moved back and forth between a parking position and an operating position and can be gripped by the user. The push bar can be locked in the parking position and/or in the operating position. For this purpose, a locking device is used, which has a locking member which interacts with the push bar to lock the push bar. By actuating an actuating member, the locking member can be moved from a locking position in which the locking member locks the push bar to a release position in which the locking member releases the push bar. At least one coupling member is used for coupling the actuating member to the at least one locking member.

To assemble the high-pressure cleaning appliance, its components must be fitted together without the occurrence of any assembly errors.

The object of the present invention is to develop a high-pressure cleaning appliance of the kind mentioned at the outset in such a way that it is more cost-effective and easier to assemble.

SUMMARY OF THE INVENTION

This object is accomplished, in accordance with the invention, in a high-pressure cleaning appliance of the generic kind in that the locking device comprises a prefabricated constructional unit which forms the actuating member, the at least one coupling member and the at least one locking member and is movably mounted on or in the housing.

The provision of a prefabricated constructional unit forming the actuating member, the at least one coupling member and the at least one locking member facilitates assembly of the high-pressure cleaning appliance as the prefabricated constructional unit can be mounted on or in the housing without the individual components of the constructional unit having to be fitted together in several assembly steps on the housing. Instead, the complete constructional unit can be positioned in a single assembly step on or in the housing. Assembly of the high-pressure cleaning appliance can, therefore, be achieved within a shorter time and, consequently, more cost-effectively. Provision of the prefabricated constructional unit also eliminates assembly errors.

The push bar is preferably lockable in its operating position. This allows the user to move the push bar into its operating position in order to move the high-pressure cleaning appliance and to lock it in this position so that he can then grip the push bar in order to push or press the high-pressure cleaning appliance.

Alternatively or additionally, it may be provided that the push bar is lockable in its parking position. This allows the user to carry the high-pressure cleaning appliance by the push bar, with the push bar locked in the parking position.

The push bar preferably comprises a handle which, in the parking position of the push bar, is at a smaller distance from the housing of the high-pressure cleaning appliance than in the operating position.

It is advantageous for the push bar to be displaceably and/or pivotably mounted on the housing.

In particular, it may be provided that the push bar is mounted on the housing so as to be movable about a displacement axis aligned parallel to a longitudinal axis of the high-pressure cleaning appliance back and forth between its parking position and its operating position and that it is lockable in both the parking position and the operating position.

It is expedient for the actuating member to comprise an actuating ram, and for the at least one coupling member to comprise a first and a second end and to be articulated at the first end to the actuating ram and at the second end to a locking member. The at least one coupling member is, therefore, articulatedly connected, on the one hand, to the actuating ram of the actuating member and, on the other hand, to a locking member. This allows a movement of the actuating member to be transmitted from the actuating ram via the at least one coupling member to a locking member, and owing to the articulated connection of the at least one coupling member, on the one hand, to the actuating ram and, on the other hand, to a locking member, a change in the direction of movement can be easily achieved and so the direction of movement of the actuating member does not have to coincide with the direction of movement of the at least one locking member. For example, it may be provided that the actuating member can be moved by the user in a first direction of movement and, as a result, at least one locking member moves in a second direction of movement, which is aligned at an angle, preferably perpendicularly, to the first direction of movement.

It is advantageous for the at least one coupling member to be integrally connected to the actuating ram by a film hinge on the ram side. In such a configuration, the actuating ram and the at least one coupling member form a one-piece component which is preferably produced from a plastic material. The film hinge on the ram side allows the at least one coupling member to be moved, for example, pivoted or slidingly displaced relative to the actuating ram.

Alternatively or additionally, it may be provided that the at least one coupling member is integrally connected to a locking member by a film hinge on the locking side. In such a configuration, the at least one coupling member and the locking member connected thereto form a one-piece component which is preferably produced from a plastic material. The film hinge on the locking side allows the locking member to be moved, for example, pivoted or slidingly displaced relative to the coupling member.

It is particularly advantageous for the prefabricated constructional unit forming the actuating member, the at least one coupling member and the at least one locking member to be configured as a one-piece plastic molded part. The number of components of the high-pressure cleaning appliance can thereby be reduced, which, in turn, makes a particularly cost-effective and simple assembly of the high-pressure cleaning appliance possible.

In an advantageous embodiment, the actuating member and the at least one locking member are displaceably mounted on the housing. For this, the housing comprises bearing elements which interact with the actuating member and with the at least one locking member, respectively, in such a way that the actuating member and the at least one locking member can be displaced relative to the housing.

It is expedient for the actuating member to be displaceable along a first displacement axis, and for the at least one locking member to be displaceable along a second displacement axis, the second displacement axis being aligned at an angle to the first displacement axis.

The first displacement axis may, for example, be aligned parallel to a longitudinal axis of the high-pressure cleaning appliance.

In particular, it may be provided that the high-pressure cleaning appliance can be positioned on a standing surface, for example, a floor surface, with vertically aligned longitudinal axis, and with the first displacement axis also vertically aligned.

The second displacement axis is expediently aligned perpendicularly to the first displacement axis.

It may be provided that the second displacement axis is aligned transversely to a longitudinal axis of the high-pressure cleaning appliance.

The user can actuate the actuating member in order to move the at least one locking member. In particular, it may be provided that the user pushes the actuating member in the manner of a push button.

It is particularly advantageous for the at least one locking member to be movable from the locking position to the release position against the action of a spring-elastic restoring force. The movement of the actuating member is transmitted to the at least one locking member via the at least one coupling member. Actuation of the actuating member causes the locking member to pass from its locking position in which it fixes the push bar to a release position in which it releases the push bar. The passing from the locking position to the release position expediently occurs against the action of a spring-elastic restoring force. Such a configuration has the advantage that the at least one locking member can automatically adopt its locking position when the user moves the push bar into the parking position or into the operating position. The push bar can, therefore, be automatically locked in the desired position. Consequently, the provision of the spring-elastic restoring force facilitates the handling of the high-pressure cleaning appliance.

In an advantageous embodiment of the high-pressure cleaning appliance in accordance with the invention, the at least one locking member is connected to the push bar in a positively locking manner in the locking position. For example, the push bar can comprise at least one positive locking element which, in the parking position or in the operating position of the push bar, interacts with a locking member to establish a positively locking connection. The positive locking element may, for example, comprise a projection which engages in a positively locking manner a recess in a locking member in order to lock the push bar. Alternatively or additionally, it may be provided that the at least one locking member comprises a projection which enters a recess of the positive locking element in order to lock the push bar.

It is expedient for the push bar to comprise at least a pair of positive locking elements arranged in spaced relation to each other, as this allows the push bar to be locked in the parking position and in the operating position, with a positive locking element interacting with a locking member in each position.

It is particularly advantageous for the at least one locking member to be latched to the push bar in the locking position. The at least one locking member may form a latching element which interacts with a corresponding latching element of the push bar in order to lock the push bar in a desired position.

In an advantageous embodiment, the housing of the high-pressure cleaning appliance comprises a first guide channel in which a guide section of the actuating member is displaceably held. As mentioned above, it may, for example, be provided that the actuating member comprises an actuating ram. It is expedient for at least a section of the actuating ram to be displaceably held in the first guide channel of the housing.

Alternatively or additionally, it may be provided that the housing comprises for each locking member a second guide channel in which the respective locking member is displaceably mounted. In this case, it is advantageous for each locking member to be fully accommodated by a second guide channel so that the second guide channel surrounds the locking member completely in the circumferential direction.

The push bar is expediently of U-shaped configuration and has two legs which are connected to each other by a handle, and the housing preferably has two third guide channels in each of which a leg is displaceably mounted. In an advantageous embodiment of the invention, the third guide channels are aligned parallel to a longitudinal axis of the high-pressure cleaning appliance.

In an advantageous embodiment of the invention, the legs of the U-shaped push bar each carry at least at their end facing away from the handle a first positive locking element which, in the operating position of the push bar, interacts in a positively locking manner with a locking member.

The legs expediently each carry a first positive locking element and a second positive locking element positioned at a distance from the first positive locking element, the first positive locking element interacting, in the operating position of the push bar, in a positively locking manner with a locking member, and the second positive locking element interacting, in the parking position of the push bar, in a positively locking manner with a locking member.

It is advantageous for the prefabricated constructional unit of the locking device to form two locking members which are each articulatedly connected to the actuating member by a coupling member and each interact with a leg of the push bar to lock the push bar. The provision of two locking members increases the mechanical stability of the locking of the push bar. This reduces the risk, for example, that the push bar will move unintentionally from its operating position to its parking position when the high-pressure cleaning appliance is moved.

The two locking members are advantageously each displaceably mounted in a guide channel of the housing. In such an embodiment of the invention, the housing forms for each of the two locking members a separate guide channel which accommodates the respective locking member.

It is expedient for the two locking members to be displaceable along a common displacement axis.

It is advantageous for the common displacement axis of the two locking members to be aligned perpendicularly to a longitudinal axis of the high-pressure cleaning appliance.

In an advantageous embodiment of the invention, the two locking members execute a movement in opposite directions when transferring from their locking position to their release position.

In a particularly preferred configuration of the high-pressure cleaning appliance in accordance with the invention, the two locking members are arranged mirror-symmetrically in relation to a longitudinal axis of the actuating member.

It is advantageous for the two coupling members by means of which the locking members are each connected to the actuating member to be arranged mirror-symmetrically in relation to the longitudinal axis of the actuating member.

The mirror-symmetrical arrangement of the locking members and/or of the coupling members facilitates assembly of the prefabricated constructional unit of the locking device. The risk of assembly errors is thereby kept particularly low.

In an advantageous embodiment of the invention, the housing comprises two half-shells in each of which a locking member is displaceably held. The use of two half-shells results in a further simplification of assembly of the high-pressure cleaning appliance. When assembling the high-pressure cleaning appliance, a locking member can be inserted into each half-shell, and the two half-shells can then be fitted together.

It is particularly advantageous for the two half-shells to jointly form a guide channel in which the actuating member is displaceably held. The guide channel can surround a guide section of the actuating member in the circumferential direction. The guide channel is formed jointly by the two half-shells. This allows the actuating member to be inserted with its guide section into the guide channel when the two half-shells are fitted together.

It is expedient for the two half-shells to define a parting plane which in a position of use of the high-pressure cleaning appliance is vertically aligned. In this context, a position of use of the high-pressure cleaning appliance is understood as meaning a position of the high-pressure cleaning appliance which it can adopt during operation of the high-pressure cleaning appliance. In this position of use, a longitudinal axis of the high-pressure cleaning appliance can, for example, be vertically aligned. The provision of a vertical parting plane enables particularly simple assembly of the high-pressure cleaning appliance as the two half-shells can be positioned at the sides of the motor pump unit so as to surround it completely in the circumferential direction after completion of assembly. The motor pump unit is formed by the motor and the pump, which can be fitted together in a previous assembly step.

It is expedient if, before fitting together the two half-shells, a locking member can be inserted, in each case, in a guide channel formed by a half-shell and if the actuating member can then be inserted in a guide channel formed jointly by the two half-shells. This enables particularly easy assembly of the high-pressure cleaning appliance.

The following description of an advantageous embodiment of the invention serves for a more detailed explanation in conjunction with the drawings.

BRIEF DESCRIPTION OF THE DRAWINGS

FIG. 7 shows a front view of the prefabricated constructional unit from FIG. 6.

DETAILED DESCRIPTION OF THE INVENTION

Figure 1:
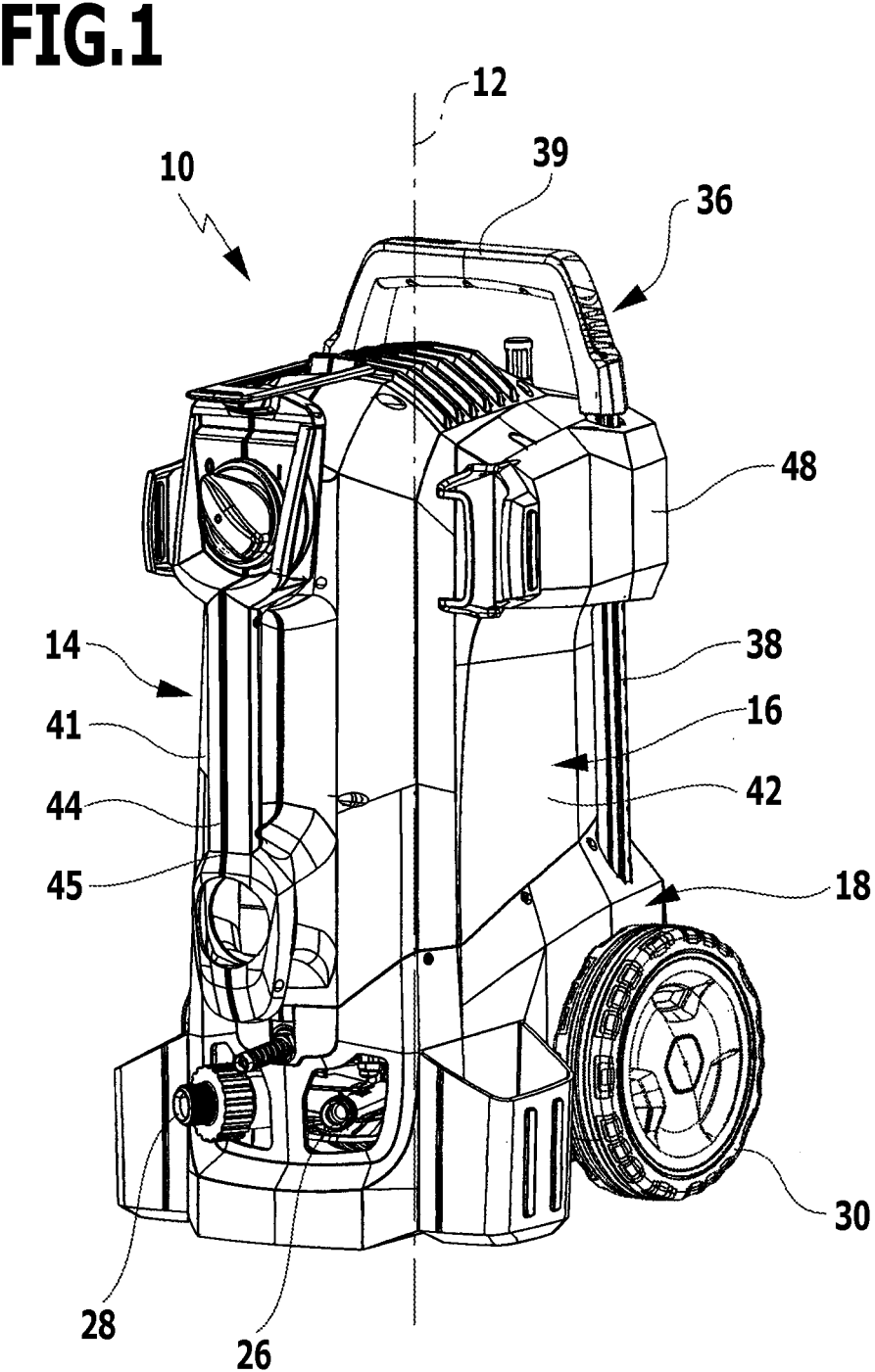
FIG. 1 shows a first perspective representation of a high-pressure cleaning appliance in accordance with the invention, with a push bar of the high-pressure cleaning appliance in a parking position.

A high-pressure cleaning appliance 10 in accordance with the invention is shown schematically in the drawings in a position of use in which a longitudinal axis 12 of the high-pressure cleaning appliance 10 is vertically aligned. The high-pressure cleaning appliance 10 comprises a housing 14 with an upper housing part 16 and a lower housing part 18, which jointly surround a motor pump unit 20 with a motor 22 and a pump 24 driven by the motor 22. A cleaning liquid, preferably water, can be pressurized by the pump 24. The cleaning liquid can be supplied to the pump 24 via a suction connection 26, and the cleaning liquid pressurized by the pump 24 can be discharged by the pump 24 via a pressure connection 28. A suction line, preferably a suction hose, can be connected to the suction connection 26, and a pressure line, for example, a pressure hose, can be connected to the pressure connection 28.

Two running wheels 30, 32 are rotatably mounted on the lower housing part 18. The high-pressure cleaning appliance 10 can be moved along a floor surface by means of the running wheels 30, 32. To do so, the high-pressure cleaning appliance 10 can be pivoted from its position of use shown in FIG. 1, in which the longitudinal axis 12 is vertically aligned, about a common axis of rotation 34 of the two running wheels 30, 32, so that the high-pressure cleaning appliance 10 can then be moved in the manner of a sack truck.

Figure 2:
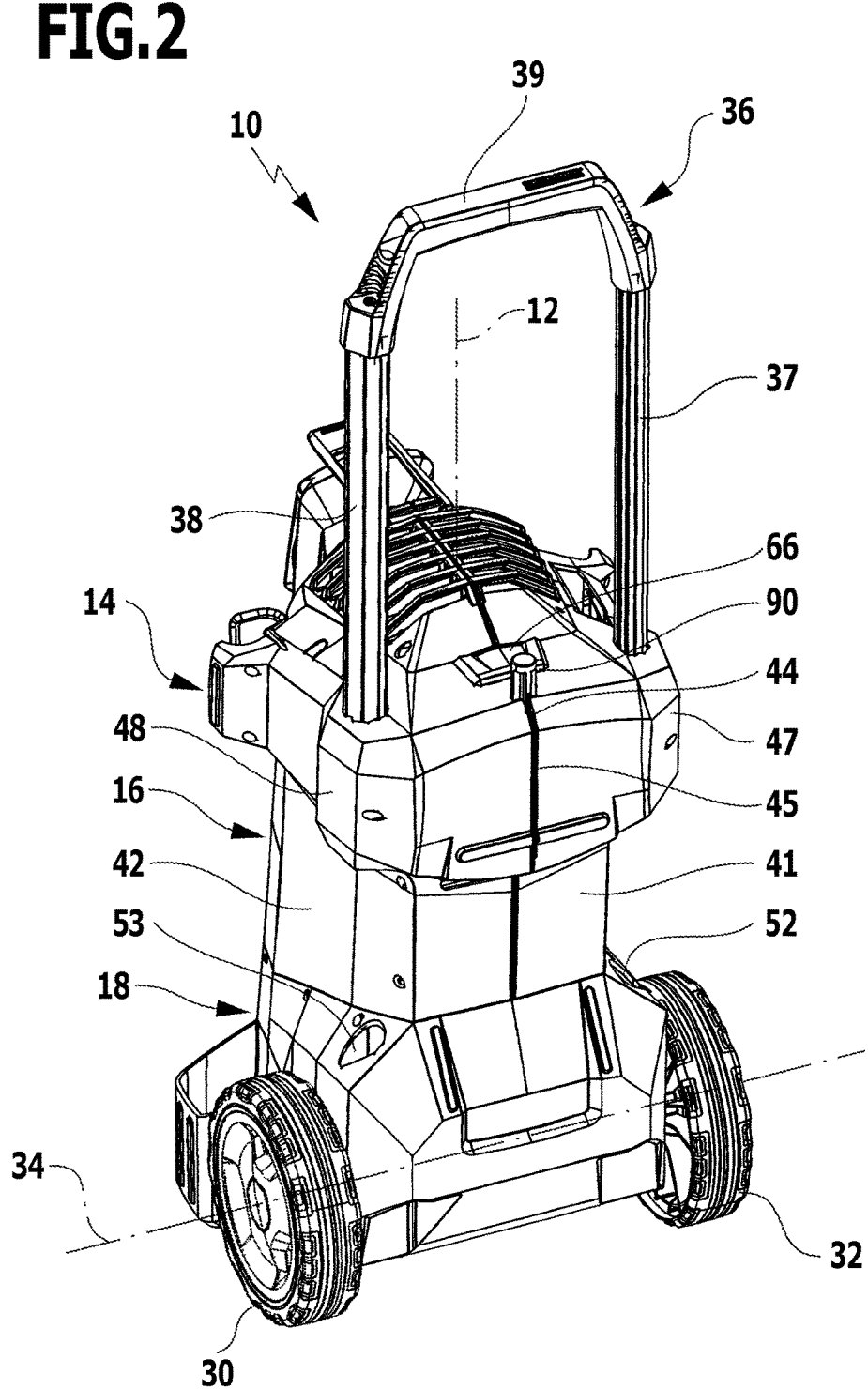
FIG. 2 shows a second perspective representation of the high-pressure cleaning appliance from FIG. 1, with the push bar in an operating position.

To make it easier for the user to move the high-pressure cleaning appliance 10, the high-pressure cleaning appliance 10 has a U-shaped push bar 36 which can be moved back and forth between a parking position shown in FIG. 1 and an operating position shown in FIG. 2. The push bar 36 has a first leg 37 and a second leg 38, which are rigidly connected to each other by a handle 39. In the operating position, the handle 39 is at a greater distance from the housing 14 than in the parking position. This makes it easier for the user to grip the handle 39 to move the high-pressure cleaning appliance 10 in a standing position.

The upper housing part 16 comprises a first half-shell 41 and a second half-shell 42. The two half-shells 41, 42 surround in the circumferential direction an upper area of the motor pump unit 20 that faces the handle 39 and are configured substantially mirror-symmetrically in relation to each other. They define between them a substantially vertically aligned parting plane 44 in which they meet with their edges facing each other and form between them a parting line 45.

On their outer sides facing away from each other, the two half-shells 41, 42 each carry a cover part 47 and 48, respectively, which is screwed to the respective half-shell 41, 42. The cover parts 47, 48 cover one guide channel each which is formed by the half-shells 41 and 42, respectively, and in which a leg 37 and 38, respectively, of the push bar 36 is displaceably mounted. One guide channel 50 is shown schematically in FIG. 3.

In alignment with the guide channels 50, the lower housing part 18 has a quiver-like receptacle 52 and 53, respectively. When the push bar 36 adopts its parking position, an end area of the legs 37, 38 enters each receptacle 52, 53. When the push bar 36 is moved into its operating position, the free ends of the legs 37, 38 come out of the receptacles 52, 53 and adopt a position at the level of the guide channels 50.

Held on each of the free ends of the legs 37, 38 is a first positive locking element 55 and 56, respectively, by means of which the push bar 36 can be locked in its operating position. Held at a distance from the first positive locking element 55 and 56, respectively, on each leg 37, 38 is a second positive locking element 57 by means of which the push bar 36 can be locked in its parking position.

Figure 3:
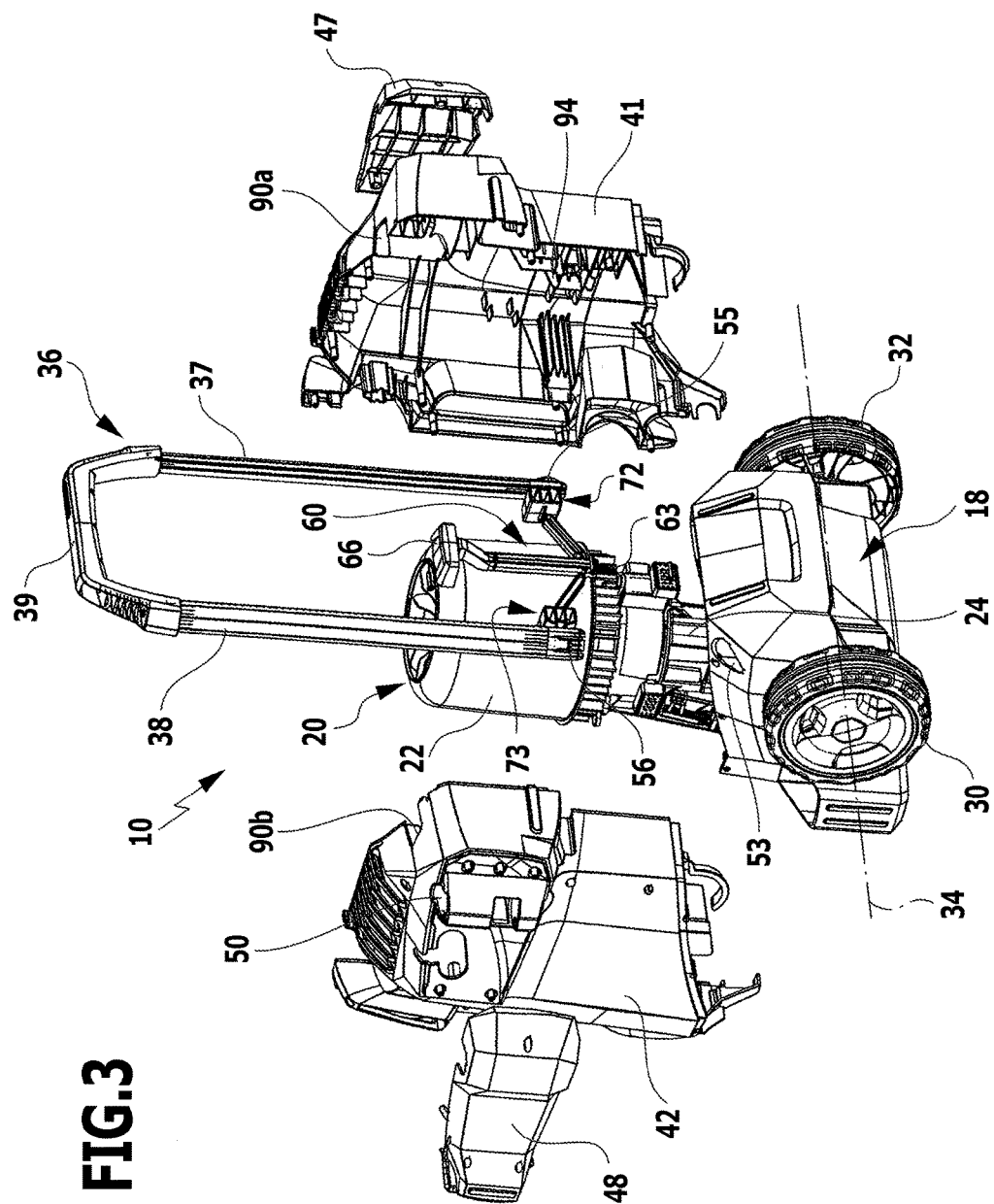
FIG. 3 shows a perspective representation of the high-pressure cleaning appliance in the manner of an exploded drawing.
Figure 4:
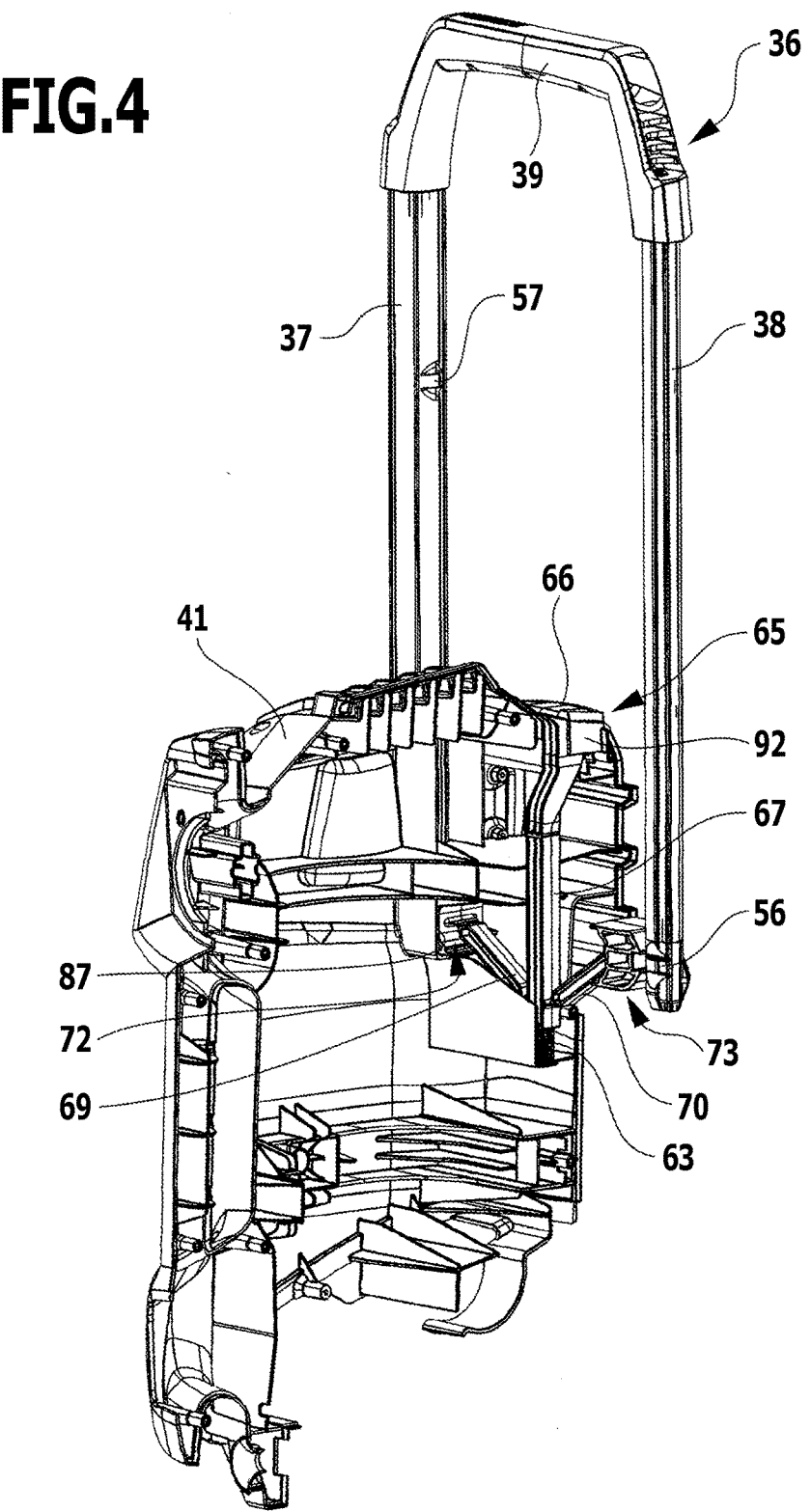
FIG. 4 shows a perspective representation of a half-shell of a housing of the high-pressure cleaning appliance from FIG. 1 in combination with the push bar and a locking device, with the push bar in its operating position.
Figure 6:
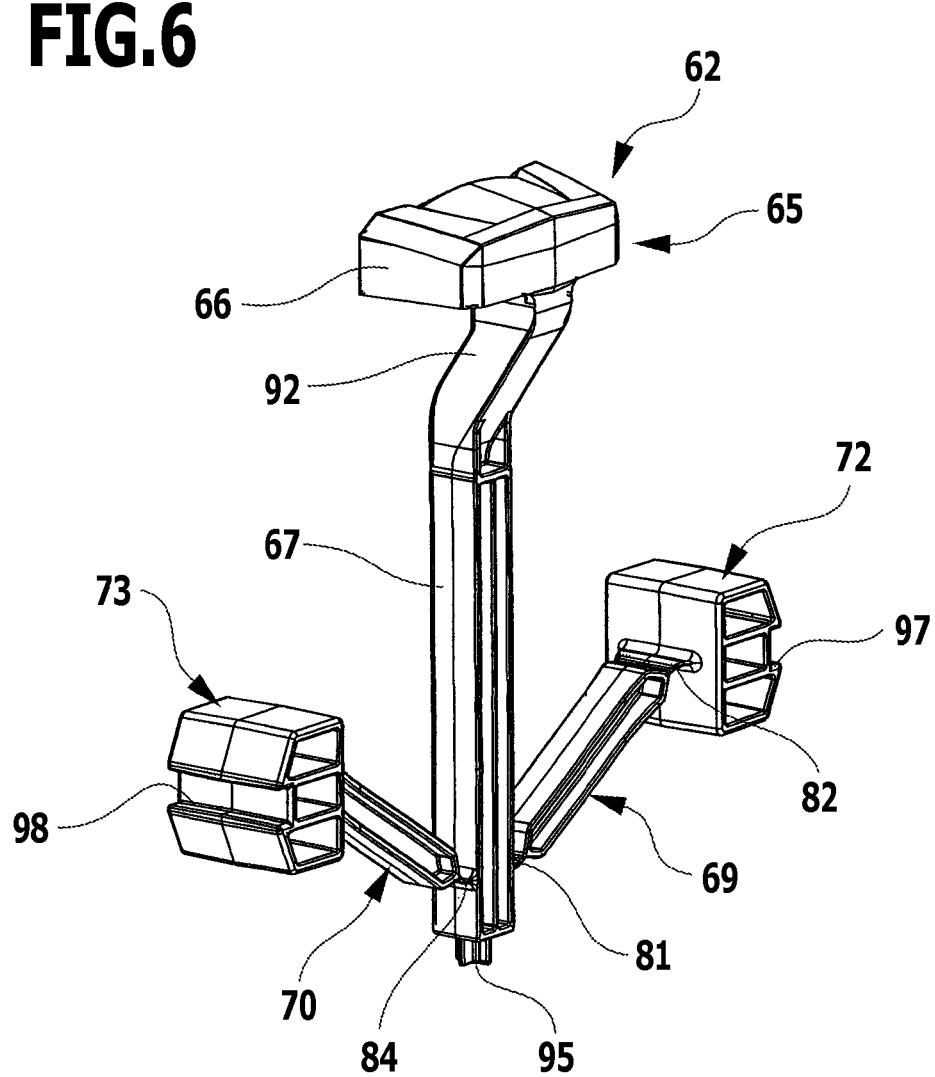
FIG. 6 shows a perspective representation of a prefabricated constructional unit of the locking device.

The high-pressure cleaning appliance 10 comprises a locking device 60 formed by a locking unit 62 shown enlarged in FIGS. 6 and 7 and a restoring spring 63 shown in FIGS. 3 and 4 for locking the push bar 36.

The locking unit 62 is configured as a prefabricated constructional unit in the form of a plastic molded part. It comprises an actuating member 65 with an actuating head 66 and an actuating ram 67 integrally connected thereto, and a first and a second coupling member 69, 70 by means of which the actuating ram 67 is articulatedly connected to a first and a second locking member 72 and 73, respectively. The two coupling members 69, 70 are of identical construction. The first coupling member 69 has a first end 75 and a second end 76, and the second coupling member 70 has a first end 78 and a second end 79. Connected to the first end 75 of the first coupling member 69 is a first film hinge 81 by means of which the first coupling member 69 is integrally and articulatedly connected to the actuating ram 67. Connected to the second end 76 of the first coupling member 69 is a second film hinge 82 by means of which the first coupling member 69 is integrally and articulatedly connected to the first locking member 72.

Connected in a corresponding manner to the first end 78 of the second coupling member 70 is a third film hinge 84 by means of which the second coupling member 70 is integrally and articulatedly connected to the actuating ram 67, and connected to the second end 79 of the second coupling member 70 is a fourth film hinge 85 by means of which the second coupling member 70 is integrally and articulatedly connected to the second locking member 73.

Figure 5:
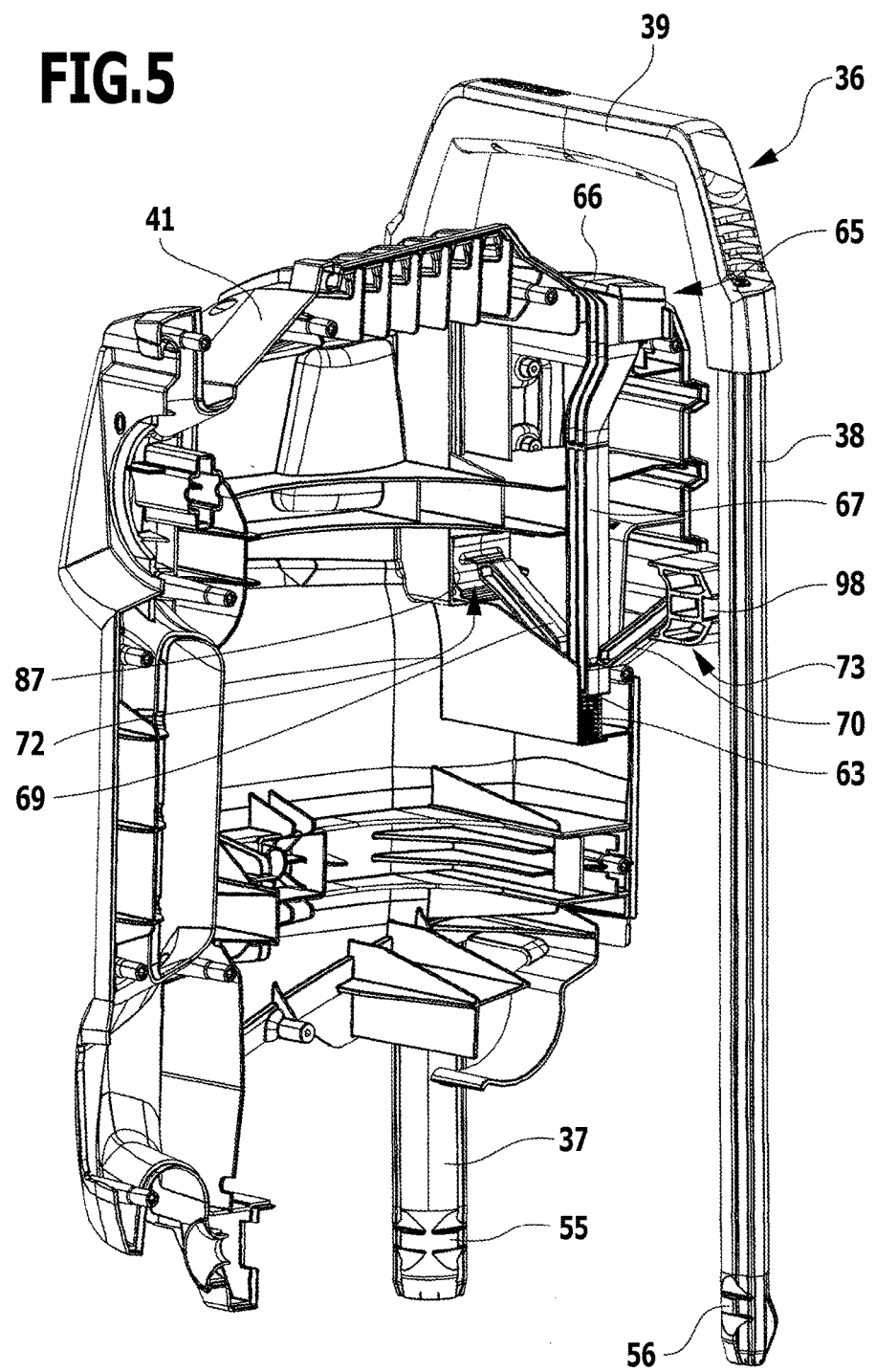
FIG. 5 shows a perspective representation of a half-shell of the housing of the high-pressure cleaning appliance corresponding to FIG. 4, with the push bar in its parking position.

The first half-shell 41 forms a guide channel 87 apparent from FIGS. 4 and 5 for the first locking member 72, and in an identical manner the second half-shell 42 forms a guide channel, which is not apparent from the drawings, for the second locking member 73.

The two half-shells 41 and 42 each form a channel half 90a and 90b, respectively, of a joint guide channel 90, which accommodates the actuating head 66 and a guide section 92 of the actuating ram 67 that directly adjoins the actuating head 66. This will be clear, in particular, from FIGS. 4 and 5.

The actuating ram 67 carries at its lower end facing away from the actuating head 66 a holding peg 95 on which the restoring spring 63 configured as a helical spring is fixed. The restoring spring 63 adopts a position in a spring receptacle which is formed by the two half-shells 41, 42 and is oriented in alignment with the joint guide channel 90.

The restoring spring 63 exerts on the actuating ram 67 a vertically upwardly directed spring force which is transmitted via the coupling members 69, 70 to the locking members 72, 73. Owing to the spring-elastic restoring force, the locking members 72, 73 are pressed against the legs 37 and 38, respectively, of the push bar 36. The locking members 72, 73 each have a U-shaped latching receptacle 97, 98, which faces a leg 37 and 38, respectively. When the push bar 36 adopts its operating position, the latching receptacles 97, 98 each interact in a positively locking manner with a corresponding latching projection of the first positive locking elements 55, 56. The push bar 36 can thereby be locked in its operating position. When the push bar 36 adopts its parking position, the latching receptacles 97, 98 each interact in a positively locking manner with a corresponding latching projection of the second positive locking elements 57. The push bar 36 can thereby be locked in its parking position.

If the locking of the push bar 36 is to be released, the user actuates the actuating member 65 by pressing the actuating head 66 and with it also the actuating ram 67 vertically downwards along a first displacement axis 101 against the action of the restoring spring 63. The guide section 92 of the actuating ram 67 is thereby displaced in the guide channel 90 along the first displacement axis 101. The movement of the actuating ram 67 along the first displacement axis 101 vertically downwards against the action of the restoring spring 63 results in the two locking members 72, 73 being pushed towards each other in the guide channels 87 along a second displacement axis 102 aligned perpendicularly to the first displacement axis 101, so that the locking members 72, 73 assume a distance from the positive locking elements 55, 56 and 57, respectively, and release these. The locking of the push bar 36 is thereby released. The user can then move the push bar 36.

Therefore, by actuating the actuating member 65, the locking members 72, 73 can be displaced from their locking position in which they form a positive lock with the positive locking elements 55, 56 and 57, respectively, against the action of the restoring spring 63 into a release position in which they release the positive locking elements 55, 56 and 57, respectively.

The locking members 72, 73 are acted upon by the restoring spring 63 with a spring force, under the action of which they automatically adopt a position on the legs 37, 38 of the push bar 36. When the push bar 36 is moved from its parking position to its operating position, the locking members 72, 73 slide along the legs 37, 38 until they meet the first positive locking elements 55, 56 and under the action of the restoring spring 63 automatically form a positive lock with the first positive locking elements 55, 56, so that the push bar 36 is locked in its operating position. When the push bar 36 is moved from its operating position to its parking position, the locking members 72, 73 slide along the legs 37, 38 until they meet the second positive locking elements 57 and under the action of the restoring spring 63 automatically form a positive lock with the second positive locking elements 57, so that the push bar 36 is locked in its parking position. The push bar is therefore automatically locked in the parking position and in the operating position by means of the locking device 60 once the push bar 36 has reached the respective position. To release the locking, the actuating member 65 has to be actuated by the user.

As mentioned above, the locking unit consisting of the actuating member 65, the two coupling members 69, 70, the two locking members 72, 73 and the film hinges 81, 82, 84, 85 is configured in the form of a one-piece plastic molded part and forms a prefabricated constructional unit. This can be easily installed on the housing 14 during assembly of the high-pressure cleaning appliance 10. To do so, the restoring spring 63 is fitted on the spring holder 95, and a locking member 72, 73 is inserted into each of the guide channels 87 of the two half-shells 41, 42. When the two half-shells 41, 42 are fitted together, the guide section 92 of the actuating ram 67 adopts a position in the joint guide channel 90 of the two half-shells 41, 42, and the restoring spring 63 adopts a position in the spring receptacle formed by the two half-shells 41, 42. The two half-shells 41, 42 can then be screwed together. In a following assembly step, the push bar 36 with its two legs 37, 38, on each of which a second positive locking element 57 is already fixed, can be inserted into the guide channels 50, so that the free ends of the legs 37, 38 project downwards out of the guide channels 50. The first positive locking elements 55, 56 can then be fixed to the free ends of the legs 37, 38. In a following assembly step, the cover parts 47, 48 can be screwed to the outer sides of the half-shells 41 and 42, respectively, which face away from each other. It is therefore relatively easy to assemble the high-pressure cleaning appliance 10, and the risk of assembly errors is low.

The invention claimed is:

1. A high-pressure cleaning appliance comprising a housing having a motor and a pump for a cleaning liquid, driven by the motor, arranged therein, and comprising at least two rotatably mounted running wheels for moving the high-pressure cleaning appliance, a push bar movable back and forth between a parking position and an operating position, and a locking device for releasably locking the push bar in at least one of the parking position and the operating position, the locking device comprising an actuating member which is coupled by at least one coupling member to at least one locking member which interacts with the push bar in a locking position and is movable from the locking position to a release position by actuating the actuating member, wherein the locking device comprises a prefabricated constructional unit which forms the actuating member, the at least one coupling member and the at least one locking member and is movably mounted on or in the housing;
wherein the actuating member comprises an actuating ram, and wherein the at least one coupling member comprises a first and a second end and is articulated at the first end to the actuating ram and at the second end to one of the at least one locking members; and
wherein the at least one coupling member is integrally connected to the at least one locking member by a first film hinge on a locking side.

2. The high-pressure cleaning appliance in accordance with claim 1, wherein the at least one coupling member is integrally connected to the actuating ram by a second film hinge on a ram side.

3. The high-pressure cleaning appliance in accordance with claim 1, wherein the prefabricated constructional unit is configured as a one-piece plastic molded part.

4. The high-pressure cleaning appliance in accordance with claim 1, wherein the actuating member and the at least one locking member are displaceably mounted on the housing.

5. The high-pressure cleaning appliance in accordance with claim 4, wherein the actuating member is displaceable along a first displacement axis, and the at least one locking member is displaceable along a second displacement axis, the second displacement axis being aligned at an angle to the first displacement axis.

6. The high-pressure cleaning appliance in accordance with claim 5, wherein the second displacement axis is aligned perpendicularly to the first displacement axis.

7. The high-pressure cleaning appliance in accordance with claim 5, wherein the first displacement axis is aligned parallel to a longitudinal axis of the high-pressure cleaning appliance.

8. The high-pressure cleaning appliance in accordance with claim 1, wherein the at least one locking member is movable from the locking position to the release position against the action of a spring-elastic restoring force.

9. The high-pressure cleaning appliance in accordance with claim 1, wherein the at least one locking member is connected to the push bar in a positively locking manner in the locking position.

10. The high-pressure cleaning appliance in accordance with claim 1, wherein the at least one locking member is latched to the push bar in the locking position.

11. The high-pressure cleaning appliance in accordance with claim 1, wherein the housing comprises a first guide channel in which a guide section of the actuating member is displaceably held.

12. The high-pressure cleaning appliance in accordance with claim 1, wherein the housing comprises for each locking member a second guide channel in which the respective locking member is displaceably mounted.

13. The high-pressure cleaning appliance in accordance with claim 1, wherein the push bar is of U-shaped configuration and has two legs which are connected to each other by a handle, and wherein the housing has two third guide channels in each of which a leg of the push bar is displaceably mounted.

14. The high-pressure cleaning appliance in accordance with claim 13, wherein the at least one coupling member comprises two coupling members, wherein the at least one locking member comprises two locking members which are each articulatedly connected to the actuating member by one of the two coupling members and wherein each of the two locking members interacts with one of the two leas to lock the push bar.

15. The high-pressure cleaning appliance in accordance with claim 14, wherein the two locking members are each displaceably mounted in a guide channel of the housing.

16. The high-pressure cleaning appliance in accordance with claim 14, wherein the two locking members are displaceable along a common displacement axis.

17. The high-pressure cleaning appliance in accordance with claim 14, wherein the two locking members are arranged mirror-symmetrically in relation to a longitudinal axis of the actuating member.

18. The high-pressure cleaning appliance in accordance with claim 14, wherein the housing comprises two half-shells in each of which one of the two locking members is displaceably held.

19. The high-pressure cleaning appliance in accordance with claim 18, wherein the two half-shells jointly form a guide channel in which the actuating member is displaceably held.

\* \* \* \* \*

UNITED STATES PATENT AND TRADEMARK OFFICE
CERTIFICATE OF CORRECTION

PATENT NO. : 10,112,220 B2
APPLICATION NO. : 14/707789
DATED : October 30, 2018
INVENTOR(S) : Peter Pfaff Page 1 of 1

It is certified that error appears in the above-identified patent and that said Letters Patent is hereby corrected as shown below:

In the Claims

At Column 10, Claim 14, Line 56, the text "interacts with one of the two leas to lock" should be changed to --interacts with one of the two legs to lock--

Signed and Sealed this
Seventh Day of May, 2019

Andrei Iancu
*Director of the United States Patent and Trademark Office*